(12) United States Patent
Endou

(10) Patent No.: US 9,227,533 B2
(45) Date of Patent: Jan. 5, 2016

(54) RECLINER

(71) Applicant: TOYOTA BOSHOKU KABUSHIKI KAISHA, Aichi-ken (JP)

(72) Inventor: Takayuki Endou, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/446,786

(22) Filed: Jul. 30, 2014

(65) Prior Publication Data

US 2015/0035338 A1  Feb. 5, 2015

(30) Foreign Application Priority Data

Aug. 1, 2013 (JP) ................................. 2013-160192

(51) Int. Cl.
*B60N 2/235* (2006.01)

(52) U.S. Cl.
CPC .............. *B60N 2/2352* (2013.01); *B60N 2/236* (2015.04)

(58) Field of Classification Search
CPC .............................. B60N 2/2352; B60N 2/236
USPC ................................ 297/367 R, 367 P, 367 L
See application file for complete search history.

(56) References Cited

U.S. PATENT DOCUMENTS

| 6,085,386 | A  | * | 7/2000 | Blanchard et al. ..... 297/367 R X |
| 6,112,370 | A  | * | 9/2000 | Blanchard et al. ..... 297/367 R X |
| 8,955,911 | B2 | * | 2/2015 | Yamada et al. ............ 297/367 P |
| 2007/0176478 | A1 | * | 8/2007 | Ohba ............................ 297/367 |

FOREIGN PATENT DOCUMENTS

JP          4816644         9/2011

OTHER PUBLICATIONS

U.S. Appl. No. 14/448,047 to Takayuki Endou et al., filed Jul. 31, 2014.

* cited by examiner

*Primary Examiner* — Rodney B White
(74) *Attorney, Agent, or Firm* — Greenblum & Bernstein, P.L.C.

(57) ABSTRACT

A recliner has a ratchet and a guide assembled together so as to be rotatable relative to each other, and a pawl supported by the guide in a circumferential direction. The pawl is adapted to inhibit rotational movement of the ratchet relative to the guide when moved to be pushed radially outwards. The pawl is supported by guide walls formed in the guide, and the guide walls are located at circumferentially opposite sides of the pawl. Each guide wall has a recessed part (weak portion) formed at a location spaced in the circumferential direction apart from a contact face of the guide wall which is in contact with the pawl. The recessed part is adapted to undergo local stress concentration and plastic deformation due to pressing force received from the pawl when a large load that causes the pawl to undergo forced deformation in the circumferential direction is applied.

5 Claims, 11 Drawing Sheets

VEHICLE INSIDE ← → VEHICLE OUTSIDE

RECLINER

INCORPORATION BY REFERENCE

The disclosure of Japanese Patent Application No. 2013-160192 filed on Aug. 1, 2013 including the specification, drawings and abstract is incorporated herein by reference in its entirety.

BACKGROUND OF THE INVENTION

1. Field of the Invention

The invention relates to a recliner. More specifically, the invention relates to a recliner that couples a seat back with a base on a floor, such that the backrest angle of the seat back can be adjusted.

2. Description of Related Art

A vehicle seat is known in which a seat back is coupled with a seat cushion via a recliner, such that the backrest angle can be adjusted (see Japanese Patent No. 4816644). The recliner has a ratchet and a guide which are assembled together to be rotatable relative to each other, and a lock mechanism that permits and inhibits relative rotation of the ratchet and the guide. In the recliner, pawls that constitute the lock mechanism are supported by the guide. When the pawls are pushed and moved radially outwards, to be brought into meshing engagement with an inner tooth flank of the ratchet, the ratchet and the guide are inhibited from rotating relative to each other, and the recliner is placed in a locked state in which the backrest angle of the seat back is fixed.

SUMMARY OF THE INVENTION

However, in the related art as described above, the recliner is not provided with an energy absorbing structure that allows excess load applied to the lock mechanism to escape by use of deformation, when a large load is applied to the recliner upon occurrence of a collision of the vehicle. Therefore, the structural strength of the lock mechanism itself needs to be increased so that the lock mechanism can keep the recliner in the locked state. The object of the invention is to provide a recliner that can absorb energy while being kept in the locked state when a large load is applied to the recliner.

A first aspect of the invention provides a recliner that couples a seat back with a base on a floor, such that a backrest angle of the seat back can be adjusted. The recliner has a ratchet and a guide which are assembled together so as to be rotatable relative to each other, and a pawl supported by the guide in a circumferential direction. The pawl is adapted to mesh with the ratchet when moved to be pushed radially outwards, so as to inhibit rotational movement of the ratchet relative to the guide. The pawl is sandwiched between and supported by guide walls formed in the guide, and the guide walls are located at circumferentially opposite sides of the pawl. Each of the guide walls has a weak portion formed at a location spaced in the circumferential direction apart from a contact face of the guide wall which is in contact with the pawl. The weak portion is adapted to undergo local stress concentration and plastic deformation due to pressing force received from the pawl when a large load that causes the pawl to undergo forced deformation in the circumferential direction is applied.

According to the first aspect of the invention, in normal use, the guide walls that support the pawl from the circumferentially opposite sides can support the pawl with high rigidity, since the pressing force received from the pawl in the circumferential direction is less likely or unlikely to reach a region of the pawl in which the weak portion is formed. When the recliner receives a large load with which the pressing force of the pawl reaches the region in which the weak portion is formed, the weak portion of the guide wall undergoes plastic deformation due to stress concentration. With this arrangement, the recliner is able to receive the large load while absorbing energy by deforming the guide wall, without damaging or breaking the pawl, while keeping the pawl in meshing engagement with the ratchet (while keeping the recliner in the locked state).

In the recliner according to the above aspect of the invention, the weak portion may be formed at an outer peripheral location of the guide wall.

In this connection, the outer peripheral location of the guide wall is closer to a load input point at which the pawl that is in mesh with the ratchet receives a load input in the rotational direction from the ratchet, as compared with the inner peripheral location of the guide wall. Therefore, when a large load is applied, stress concentration can be caused to effectively occur in the weak portion, so that the guide wall can appropriately undergo plastic deformation.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described with reference to the drawings.

Figure 1:
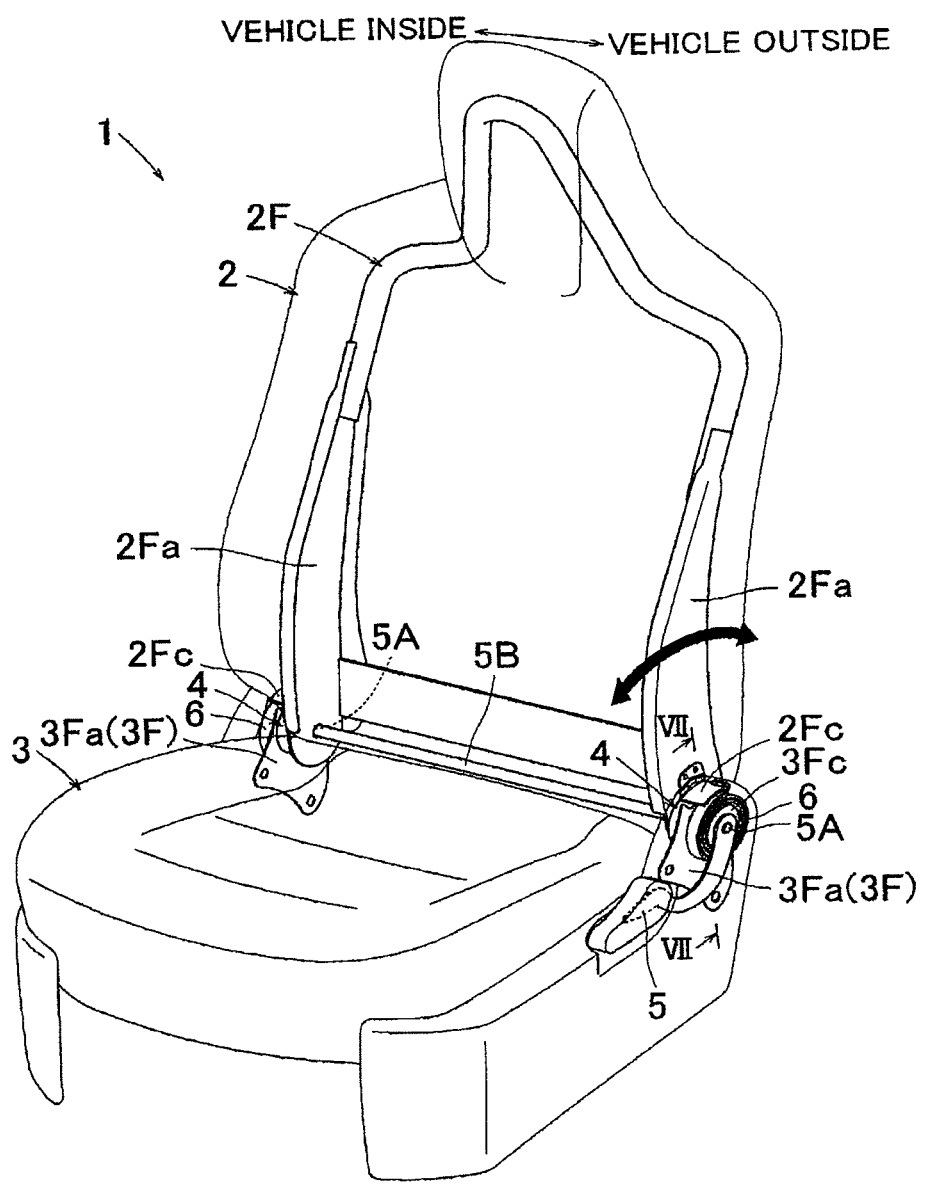
FIG. 1 is a perspective view showing the general construction of a vehicle seat in which a recliner as a first embodiment of the invention is used.

Initially, the construction of a recliner 4 according to a first embodiment of the invention will be described with reference to FIG. 1 through FIG. 11. As shown in FIG. 1, the recliner 4 of this embodiment is used for a seat 1 that constitutes a passenger seat of a small car. The seat 1 has a seat back 2 that serves as a backrest for a seated occupant, and a seat cushion 3 that serves as a seating portion. The recliner 4 functions as a pivotal device (coupling device) that couples the seat back 2 with the seat cushion 3 such that the backrest angle can be adjusted, and is able to inhibit rotation of the seat back 2 relative to the seat cushion 3. Here, the seat cushion 3 functions as "base" of the invention. The recliners 4 as described above are respectively interposed between lower end portions of right and left side frames 2Fa of a back frame 2F that forms the framework of the seat back 2, and rear end portions of right and left side frames 3Fa of a cushion frame 3F that forms the framework of the seat cushion 3. Thus, the recliners 4 couple the side frames 2Fa of the back frame 2F with the side frames 3Fa of the cushion frame 3F (see FIG. 2 and FIG. 3). More specifically, each of the side frames 2Fa of the seat back 2 is located inside a corresponding one of the side frames 3Fa of the seat cushion 3, and the recliner 4 is interposed between these side frames 2Fa, 3Fa.

As shown in FIG. 1, each of the recliners 4 as described above is normally held in a locked state in which the backrest angle of the seat back 2 is fixed. A reclining lever 5 is provided on the outer side (the right-hand side on the paper of FIG. 1) of the seat cushion 3 as viewed in the vehicle width direction. When the reclining lever 5 is pulled up, the recliners 4 are released from the locked state at the same time, and switched to an unlocked state in which the backrest angle of the seat back 2 can be changed. When the reclining lever 5 is returned from the pulled-up position to the original position, the recliners 4 are returned to the locked state in which the backrest angle of the seat back 2 is fixed, under bias force.

Return springs 6 are mounted between the right and left side frames 2Fa of the seat back 2 and the right and left side frames 3Fa of the seat cushion 3, respectively. The return springs 6 constantly apply bias force to the seat back 2 in such a direction as to tilt the seat back 2 forward. Each of the return springs 6 is in the form of a spiral spring, and an inner end portion of the return spring 6 is engaged with a bracket 3Fc joined to an outer surface of each side frame 3Fa of the seat cushion 3, while an outer end portion of the return spring 6 is engaged with a bracket 2Fc joined to an outer surface of each side frame 2Fa of the seat back 2 (see FIG. 7).

When the recliners 4 are released from the locked state in which the backrest angle is fixed, the seat back 2 is raised up to the position at which the seat back 2 hits against the back of the seated occupant, under the rotary bias force of the return springs 6. In this condition, if the seated occupant moves his/her back to tilt it back and forth, the seat back 2 is also tilted back and forth, so that the backrest angle can be freely adjusted in accordance with the movement of the seated occupant. With this biasing arrangement, the backrest angle of the seat back 2 can be easily adjusted.

The seat back 2 is able to rotate over an about 180-degree rotational region from a forward-tilt position at which the seat back 2 is in a folded state on the upper surface of the seat cushion 3, to a backward-tilt position to which the seat back 2 is tilted backward and laid down. This rotational region includes an about 90-degree rotational region from the upright position at which the seat back 2 stands upright to the above-mentioned backward-tilt position, and this region is set as a rotational region called "lock zone" in which the seat back 2 is returned to the locked state in which the backrest angle is fixed when the operation to pull up the reclining lever 5 is stopped. Also, the above-indicated 180-degree rotational region also includes an about 90-degree rotational region from the position at which the seat back 2 goes beyond the front side of the "lock zone", to the above-mentioned forward-tilt position. This region is set as a rotational region called "free zone" in which the seat back 2 is not returned to the locked state in which the backrest angle is fixed even if the operation to pull up the reclining lever 5 is stopped.

The above-mentioned lock zone and free zone are respectively formed by a lock zone and a free zone set for each of the recliners 4 as will be described later. With the free zone thus provided, if the reclining lever 5 is operated in a condition where no one is seated in the seat 1, and the seat back 2 is tilted to a position that falls within the free zone under the bias force, the seat back 2 will be automatically tilted forward to the position at which the seat back 2 is folded on the upper surface of the seat cushion 3 even if the reclining lever 5 is not kept operated.

Figure 2:
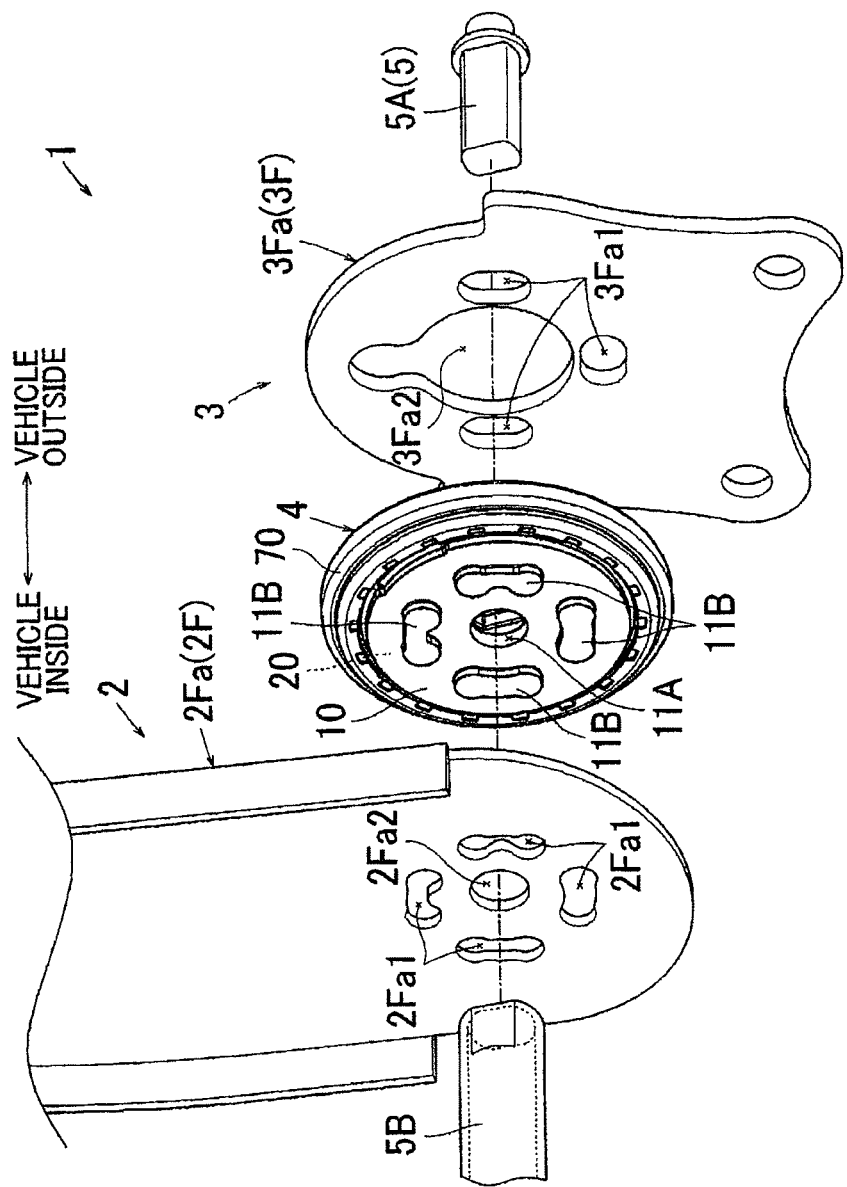
FIG. 2 is an exploded perspective view of a portion of the seat in which the recliner is mounted, as viewed from one side of the seat.
Figure 3:
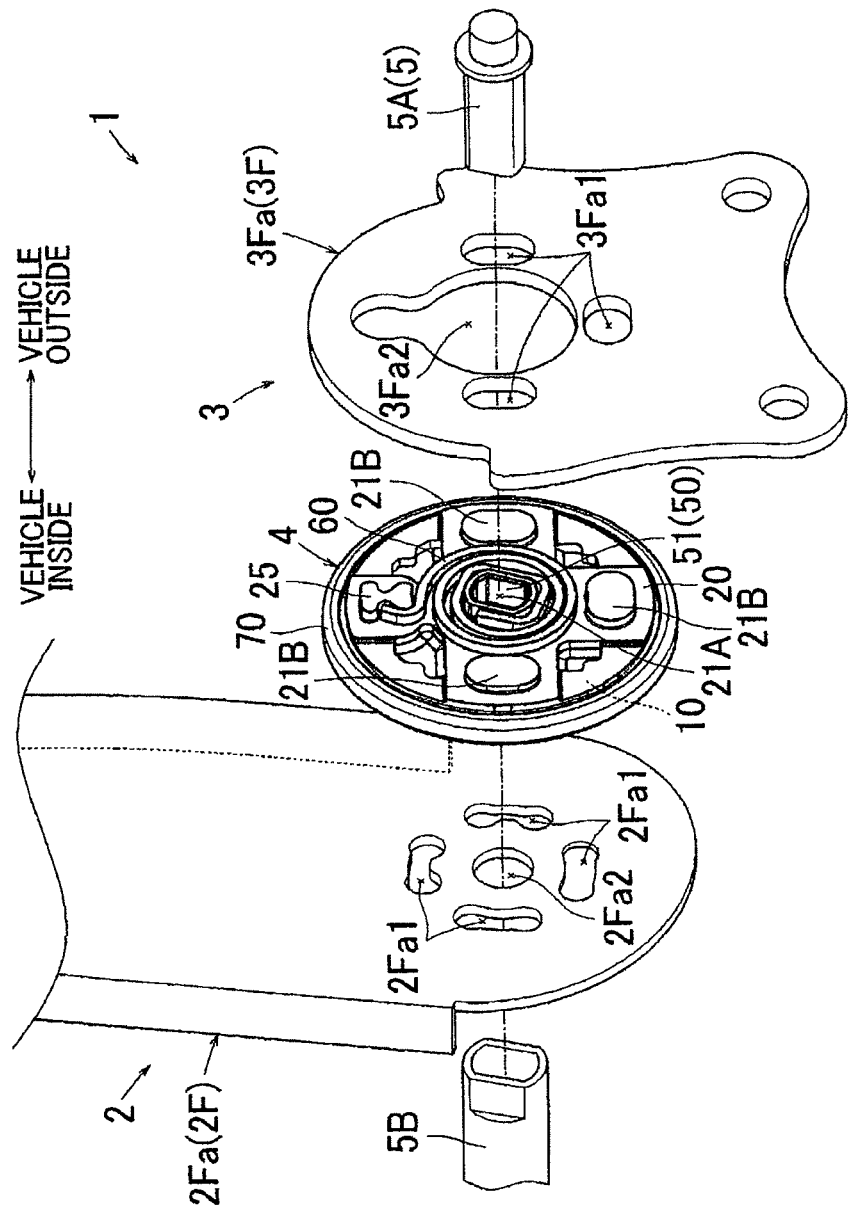
FIG. 3 is an exploded perspective view of a portion of the seat in which the recliner is mounted, as viewed from the other side of the seat.

As shown in FIG. 2 and FIG. 3, each of the recliners 4 has a ratchet 10 and a guide 20. The ratchet 10 is joined integrally to the outer surface of each of the side frames 2Fa of the seat back 2, and the guide 20 is joined integrally to the inner surface of each of the side frames 3Fa of the seat cushion 3. The recliner 4 is arranged to fix the backrest angle of the seat back 2 or make it variable, by inhibiting or permitting relative rotation of the ratchet 10 and the guide 20.

Figure 4:
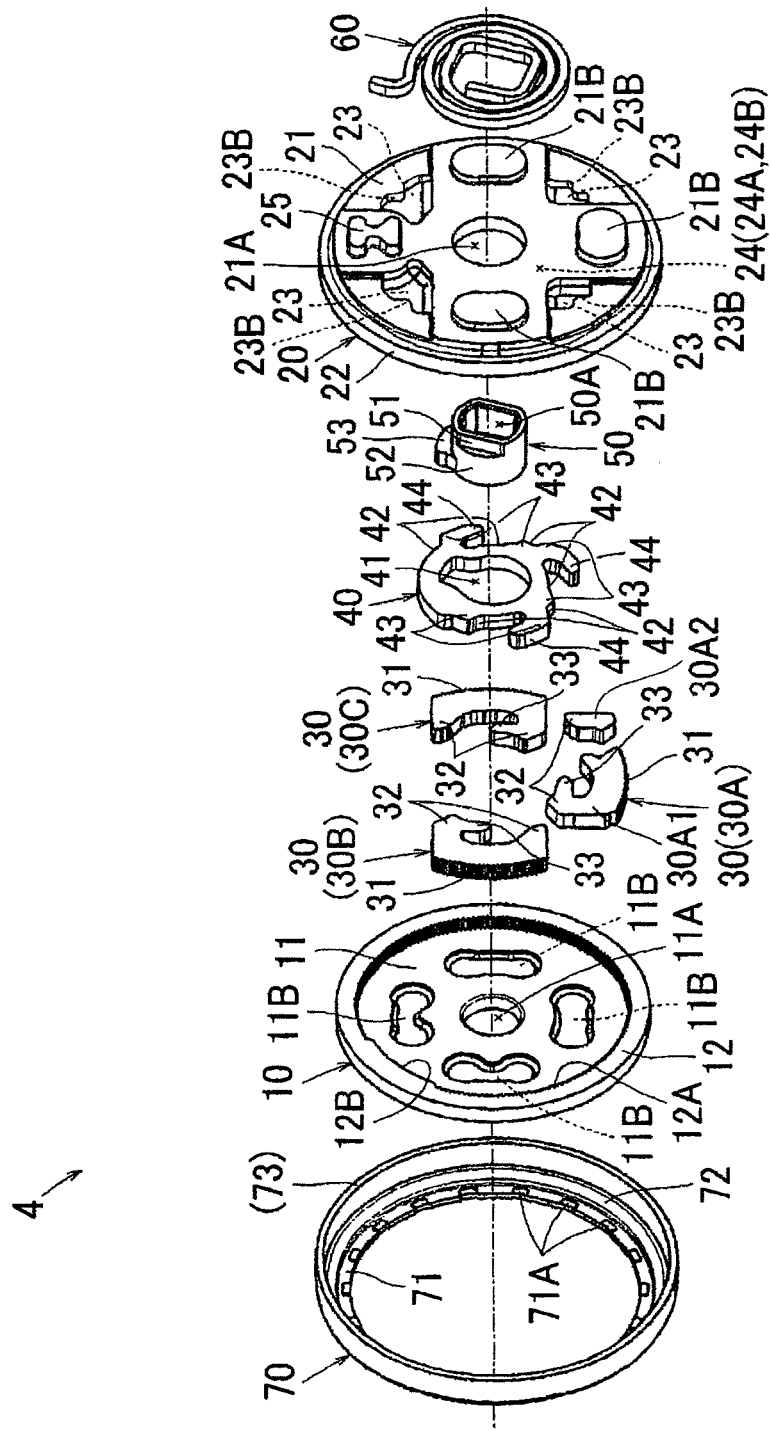
FIG. 4 is an exploded perspective view of the recliner as viewed from one side thereof.
Figure 5:
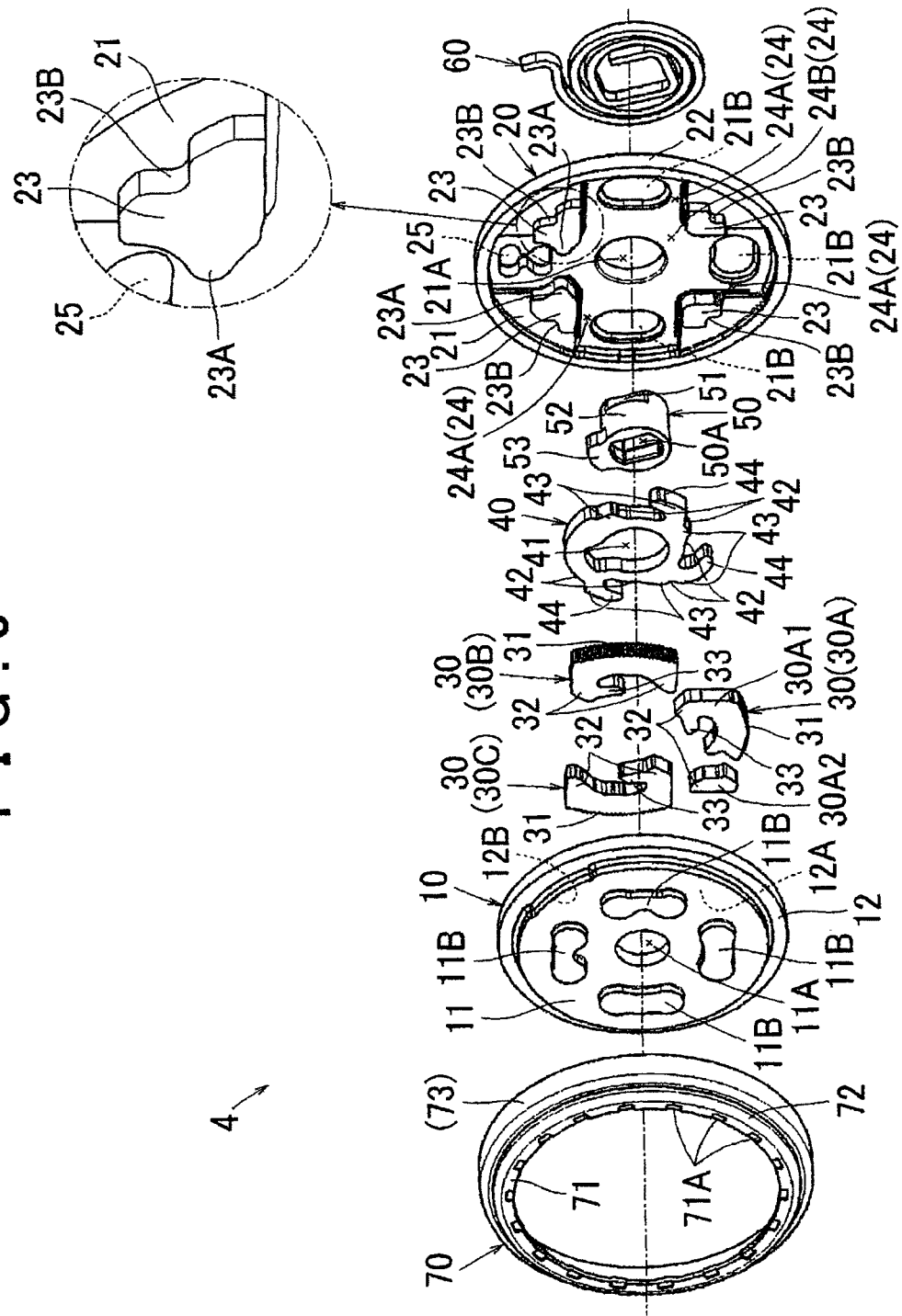
FIG. 5 is an exploded perspective view of the recliner as viewed from the other side thereof.

In the following, the specific construction of each recliner 4 as described above will be described in detail. While the recliners 4 on the right and left sides of the seat 1 are installed symmetrically with each other, they have substantially the same construction. Accordingly, the construction of the recliner 4 located on the outer side of the vehicle as shown in FIG. 2 and FIG. 3 will be described. As shown in FIG. 4 and FIG. 5, the recliner 4 has the disc-shaped ratchet 10 and guide 20 that are axially assembled together, three pawls 30 (30A-30C) mounted between the ratchet 10 and the guide 20, a rotating cam 40, a hinge cam 50, a lock spring 60 mounted on the outer surface of the guide 20, and an outer ring 70. The outer ring 70 is formed in a stepped, cylindrical shape, and extends across the ratchet 10 and the guide 20 when mounted in position. The ratchet 10, guide 20, three pawls 30, rotating cam 40 and hinge cam 50 are respectively formed of hard steel sheets subjected to hardening.

As shown in FIG. 4, the ratchet 10 is formed in a generally disc-like shape, and includes a disc main body 11 and a cylindrical portion 12 formed at an outer peripheral portion of the disc main body 11. The cylindrical portion 12 protrudes in a cylindrical shape in an axial direction in which the ratchet 10 is mounted to the guide 20. The cylindrical portion 12 is formed by extruding the outer peripheral portion of the disc main body 11 into a cylindrical shape in the thickness direction by half blanking. The cylindrical portion 12 is formed at its inner circumferential surface with an inner tooth row 12A having internal teeth arranged to mesh with external teeth on outer tooth rows 31 formed on outer circumferential surfaces of respective pawls 30 (which will be described later), such that the external teeth of the pawls 30 are pressed radially outwards against the internal teeth of the cylindrical portion 12. The inner tooth row 12A is formed over substantially the entire circumference of the inner circumferential surface of the cylindrical portion 12, and the internal teeth are arranged at a pitch of two degrees in the circumferential direction. Also, the cylindrical portion 12 has an uplifted portion 12B formed in one circumferential region thereof in which the inner tooth row 12A is not formed. The uplifted portion 12B protrudes radially inwards from the inner tooth row 12A, to form a smooth arcuate face.

Figure 6:
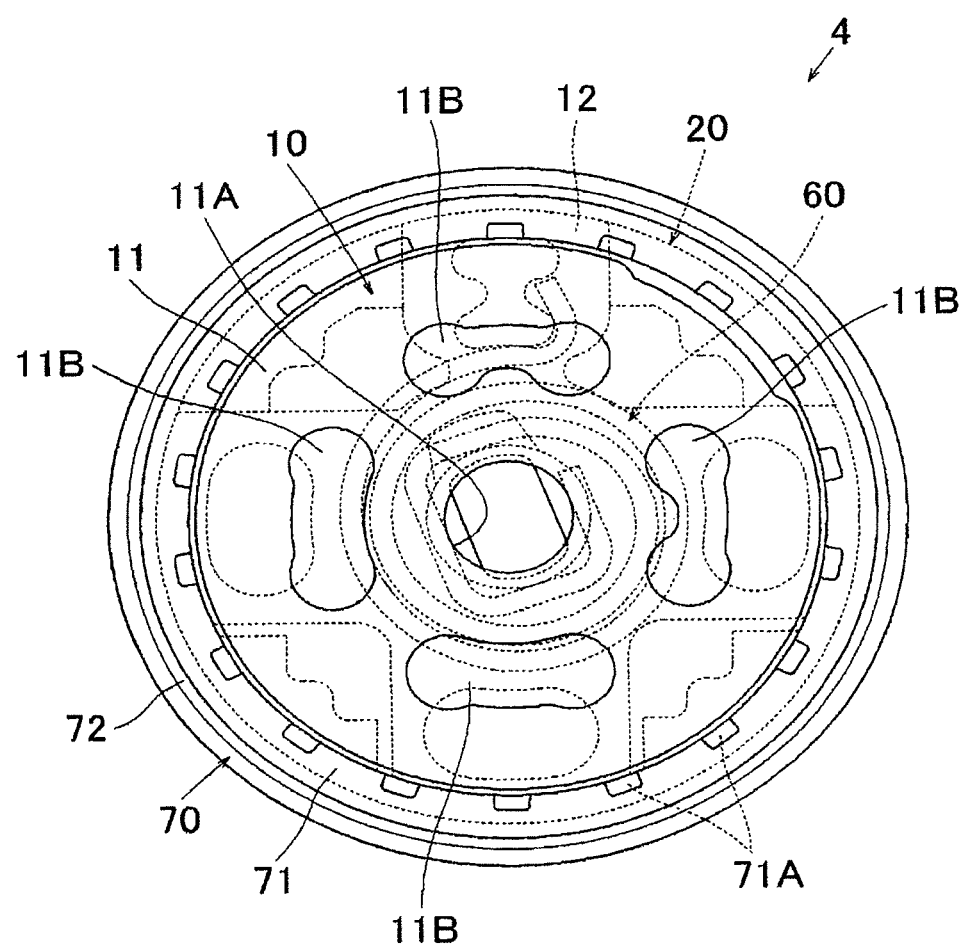
FIG. 6 is a front view of the recliner as seen from the ratchet side.
Figure 7:
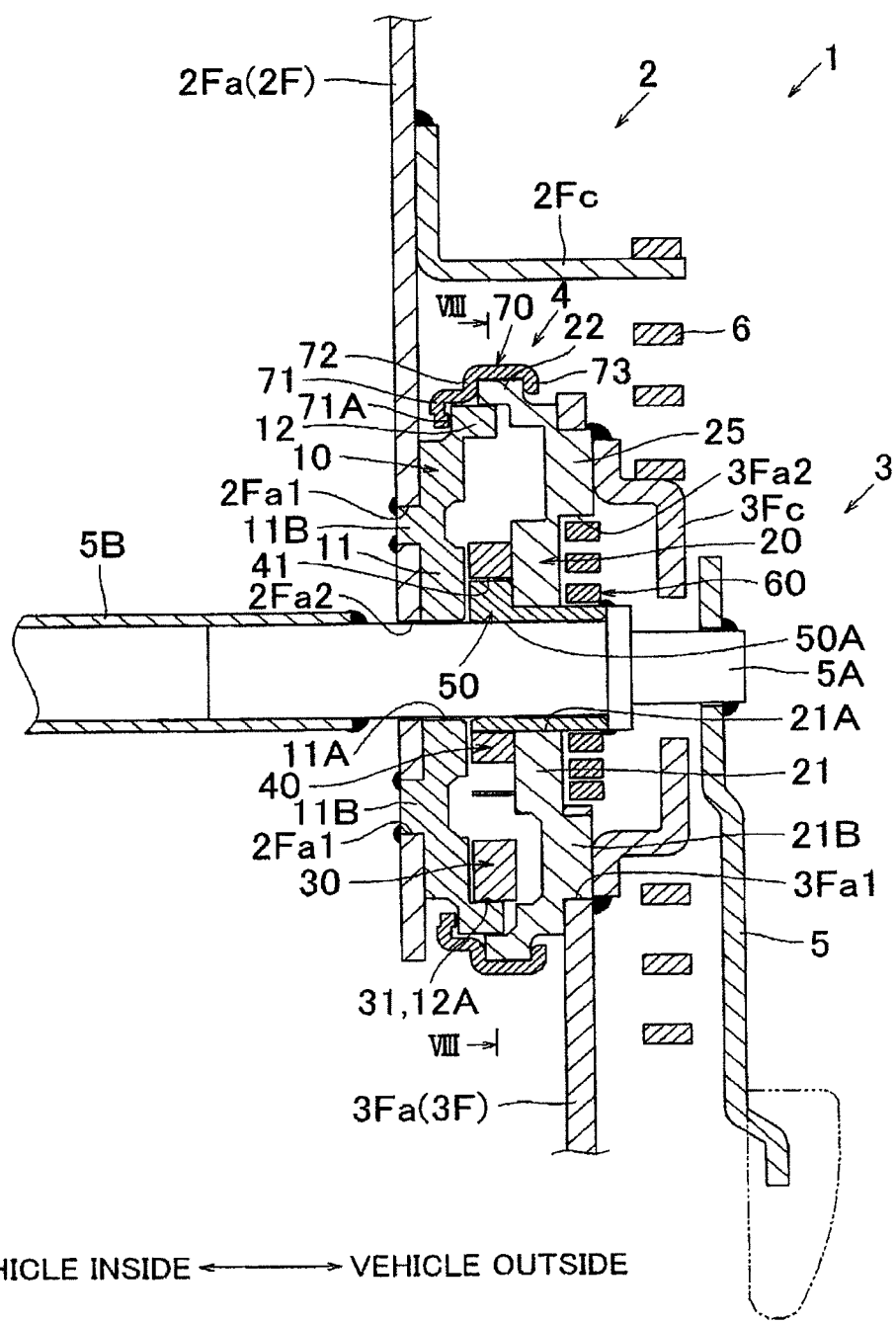
FIG. 7 is a cross-sectional view taken along line VII-VII in FIG. 1.

A through-hole 11A in the shape of a round hole is formed in a central portion of the disc main body 11 of the ratchet 10. An operating pin 5A that is inserted through and mounted in the hinge cam 50 is inserted from the axially outer side into the through-hole 11A. Also, as shown in FIG. 5 and FIG. 6, four dowels 11B that protrude in an oval shape are formed on the outer surface of the disc main body 11 of the ratchet 10 such that the dowels 11B are arranged at equal intervals in the circumferential direction. These dowels 11B are formed by half-blanking a part of the disc main body 11 of the ratchet 10 in the thickness direction. As shown in FIG. 2 and FIG. 7, when the outer surface of the disc main body 11 of the ratchet 10 is placed against and joined to the outer surface of the side frame 2Fa of the seat back 2, these dowels 11B are fitted into four dowel holes 2Fa1 formed in the side frame 2Fa, respectively, and joined integrally to the side frame 2Fa by welding. Thus, the dowels 11B function as joints. The side frame 2Fa of the seat back 2 is further formed with a round through-hole 2Fa2 that permits the above-mentioned operating pin 5A to be passed therethrough in the axial direction.

As shown in FIG. 4 and FIG. 5, the guide 20 is formed in a generally disc-like shape having a larger outside diameter than the ratchet 10, and includes a disc main body 21 and a cylindrical portion 22 formed at an outer peripheral portion of the disc main body 21. The cylindrical portion 22 protrudes in a cylindrical shape in the axial direction in which the guide 20 is mounted to the ratchet 10. The cylindrical portion 22 is formed in a size large enough to allow the cylindrical portion 12 of the ratchet 10 to be loosely fitted in the cylinder thereof. With the cylindrical portion 12 of the ratchet 10 fitted into and assembled with the cylindrical portion 22 of the guide 20, these cylindrical portions 12, 22 are loosely engaged with each other, to support each other in radial directions, such that the guide 20 and the ratchet 10 can rotate relative to each other. The outer ring 70 is mounted so as to extend across the outer periphery of the cylindrical portion 22 of the guide 20 and the outer periphery of the cylindrical portion 12 of the ratchet 10. With the outer ring 70 thus provided, the guide 20 is assembled with the ratchet 10 while being prevented from coming off in the axial direction, such that the guide 20 and the ratchet 10 can rotate relative to each other with their disc portions sliding against each other (see FIG. 2, FIG. 3 and FIG. 7).

A through-hole 21A in the shape of a round hole is formed in a central portion of the disc main body 21 of the guide 20. A shaft portion 52 of the hinge cam 50 (which will be described later) is inserted through the through-hole 21A from the axially inner side to the outer side, to be mounted rotatably about its axis. As shown in FIG. 4, three dowels 21B that protrude in an oval shape are formed on the outer surface of the disc main body 21 of the guide 20 such that the dowels 21B are spaced at intervals of 90 degrees in the circumferential direction. More specifically, each of the dowels 21B is formed on each of circumferential regions in which three pawl receiving recesses 24A (which will be described later) are formed, on the outer surface of the disc main body 21 of the guide 20. Each of the dowels 21B is formed by half-blanking a part of the disc main body 21 of the guide 20 in the thickness direction. As shown in FIG. 3 and FIG. 7, when the outer surface of the disc main body 21 of the guide 20 is placed against and joined to the side frame 3Fa of the seat cushion 3, these dowels 21B are respectively fitted in three dowel holes 3Fa1 formed in the side frame 3Fa so as to be integrally joined by welding to the side frame 3Fa. Thus, the dowels 21B function as joints. The side frame 3Fa of the seat cushion 3 is further formed with a through-hole 3Fa2 through which the operating pin 5A and the lock spring 60 mounted on the outer surface of the disc main body 21 of the guide 20 can be passed in the axial direction.

As shown in FIG. 5, guide walls 23 are formed at circumferentially-spaced four positions on the inner surface of the disc main body 21 of the guide 20. The guide walls 23 protrude in a fan shape in the axial direction in which the guide 20 is mounted to the ratchet 10. These guide walls 23 are formed by half-blanking a part of the disc main body 21 of the guide 20 in the thickness direction, so that each guide wall 23 is extruded in the thickness direction, into a fan-like shape that spreads radially outwards. With the guide walls 23 thus formed, pawl receiving recesses 24A that can receive the three pawls 30 are formed in circumferential regions located between adjacent ones of the guide walls 23, as shown in FIG. 5. The guide walls 23 are arranged to support the corresponding pawls 30 set in the pawl receiving recesses 24A, from the circumferentially opposite sides of the pawls 30, so that the pawls 30 can only be moved radially inwards and outwards. Also, with the guide walls 23 thus formed, a cam receiving recess 24B is formed in a central region of the guide 20 surrounded by the guide walls 23. The cam receiving recess 24B can receive the rotating cam 40 such that the cam 40 is rotatable about its axis within the recess 24B.

The upper two guide walls 23 between which no pawl 30 is disposed, out of the four guide walls 23 as described above, are formed with extended portions 23A that abut on the outer periphery of the rotating cam 40 set in the cam receiving recess 24B and support the cam 40. With the rotating cam 40 thus supported by the extended portions 23A, forces applied to the rotating cam 40 can be kept balanced, even if the rotating cam 40 supports the pawls 30 from the radially inner side, at three positions that are not equally spaced in the circumferential direction, and therefore, upwardly biased reaction force is applied from the pawls 30 to the rotating cam 40 (see FIG. 8).

The three pawl receiving recesses 24A formed in the circumferential regions between the guide walls 23 and the cam receiving recess 24B formed in the central portion of the guide 20 are formed as a parts of a guide recess 24 that is depressed relative to the guide walls 23 formed by extrusion as described above, such that the bottom surfaces of the recesses 24A, 24B are flush with each other. Thus, the guide 20 is assembled with the ratchet 10 such that the three pawls 30, rotating cam 40 and the hinge cam 50 are mounted and supported therebetween.

As shown in FIG. 4, a spring engaging portion 25 to be engaged with an outer end portion of the lock spring 60 is formed on the outer surface of the disc main body 21 of the guide 20 to protrude therefrom. The spring engaging portion 25 is formed by half-blanking a part of the disc main body 21 of the guide 20 in the thickness direction. The spring engaging portion 25 is formed at a position that is spaced by 90 degrees in the circumferential direction from two of the dowels 21B located adjacent to the spring engaging portion 25, so that the spring engaging portion 25 and the three dowels 21B are spaced at equal intervals (i.e., 90 degrees) in the circumferential direction on the outer surface of the disc main body 21. The spring engaging portion 25 has a narrowed middle portion with which the outer end portion of the lock spring 60 can be engaged.

Figure 8:
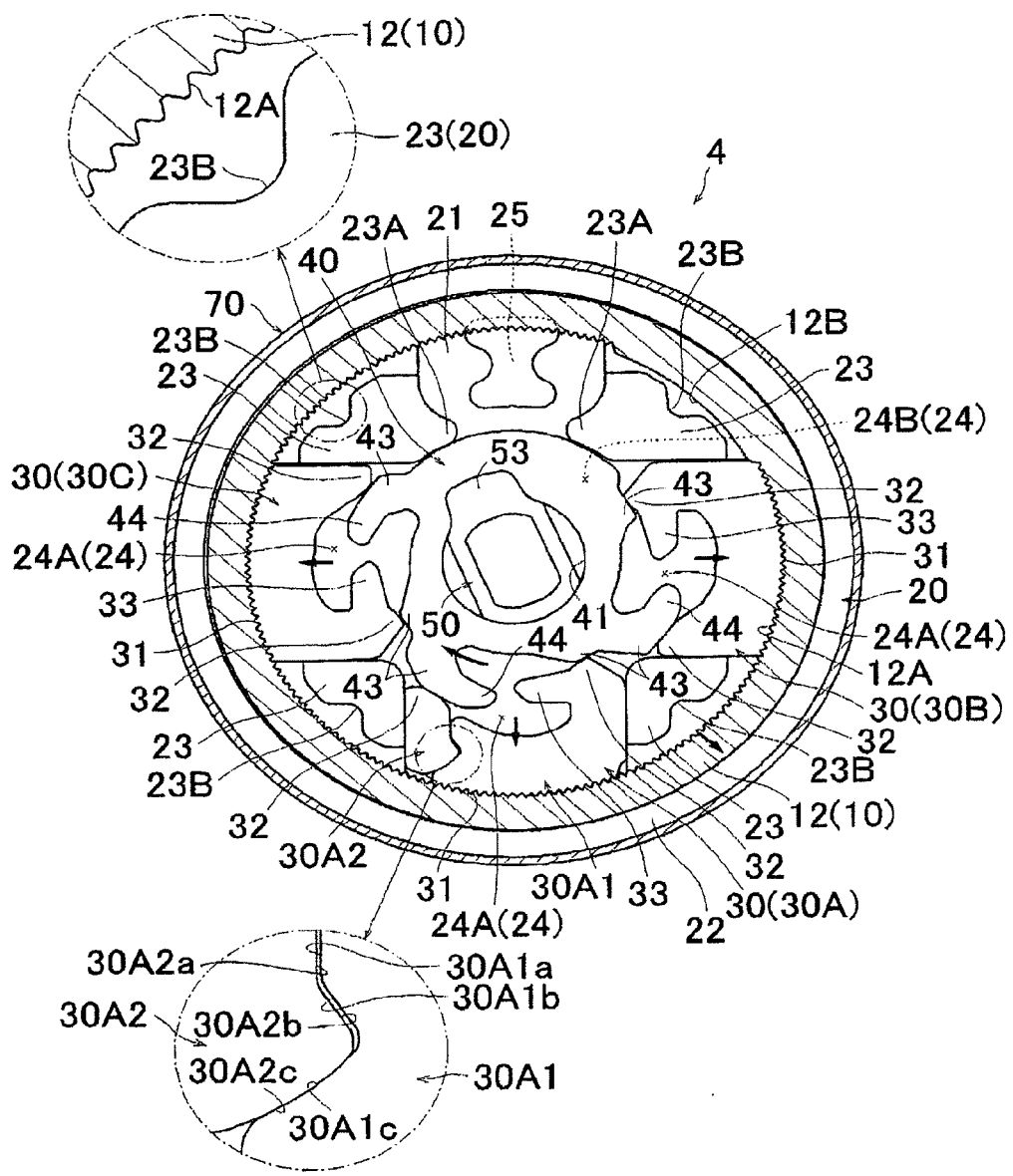
FIG. 8 is a cross-sectional view taken along line VIII-VIII in FIG. 7, showing a locked state of the recliner.

As shown in FIG. 5 and FIG. 8, the three pawls 30 are respectively received and mounted in the pawl receiving recesses 24A formed in the inner surface of the disc main body 21 of the guide 20. Each of the pawls 30 thus mounted is supported in the circumferential direction, such that it can only move radially inwards and outwards, relative to the guide 20, along the shape of the corresponding pawl receiving groove 24A. As shown in FIG. 7, when each pawl 30 received in the corresponding pawl receiving recess 24A is moved radially outwards to the radially outer position, the pawl 30 is brought into meshing engagement with the inner tooth row 12A formed on the inner circumferential surface of the cylindrical portion 12 of the ratchet 10.

Figure 9:
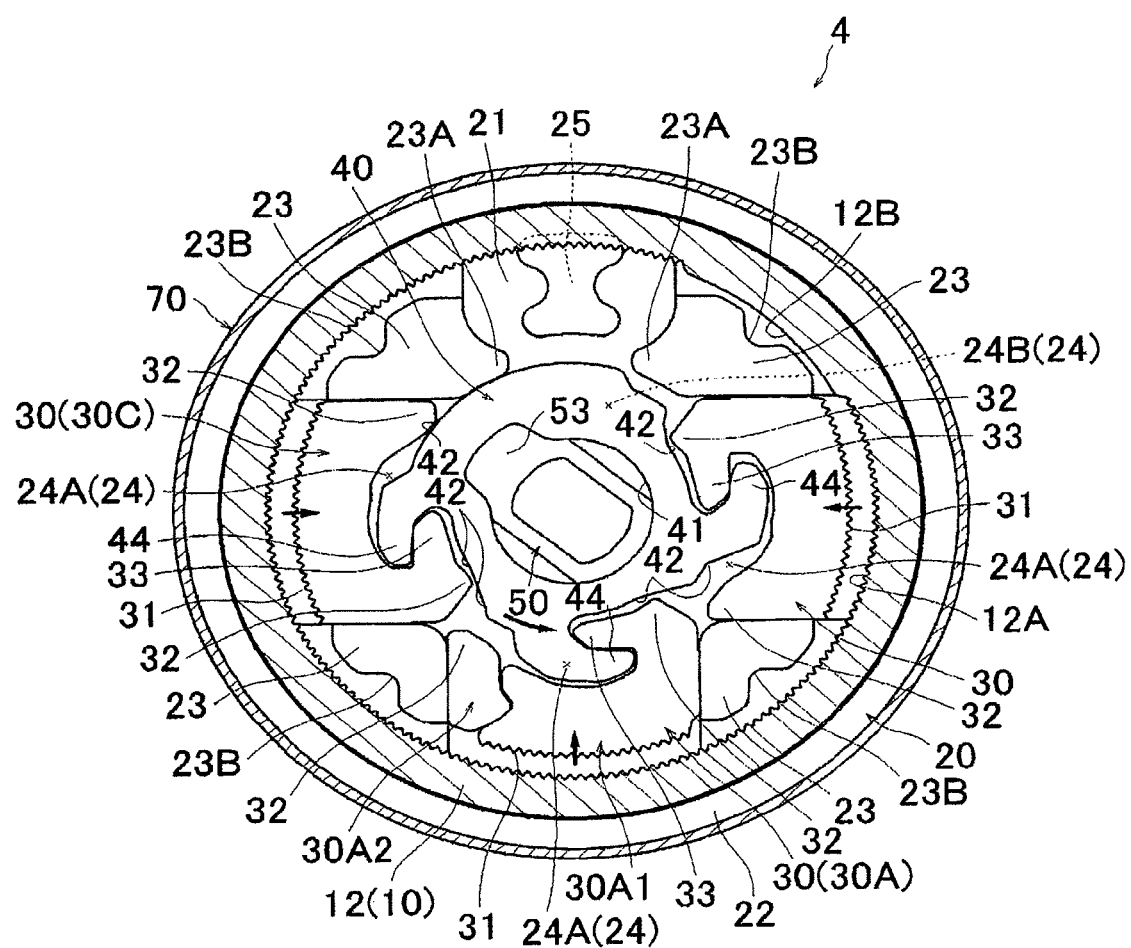
FIG. 9 is a cross-sectional view showing an unlocked state of the recliner.

As shown in FIG. 4 and FIG. 5, each of the pawls 30 is formed at its outer circumferential surface with the outer tooth row 31 that can mesh with the inner tooth row 12A of the ratchet 10. The outer tooth row 31 has a plurality of external teeth formed on the outer circumferential surface of the pawl 30 which is curved in an arcuate shape, and the external teeth are arranged at a pitch of two degrees in the circumferential direction. As shown in FIG. 8 and FIG. 9, when the rotating cam 40 set in the central portion of the guide 20 is operated to be rotated, the pawls 30 are operated to be pushed radially outwards by the rotating cam 40 (see FIG. 8), or pulled radially inwards (see FIG. 9).

As shown in FIG. 8, when the pawls 30 are pushed radially outwards as the rotating cam 40 rotates, the outer tooth rows 31 formed on the outer circumferential surfaces of the pawls 30 are pressed against and meshed with the inner tooth row 12A of the ratchet 10. As a result, the pawls 30 are joined to ratchet 10 so as to be movable as a unit in the rotational direction, and the ratchet 10 and the guide 20 connected via the pawls 30 are inhibited from rotating relative to each other. Namely, the pawls 30, which are supported by the guide walls 23 in the circumferential direction, can only move radially inwards and outwards, in relation to the guide 20; therefore, the pawls 30 function to inhibit rotation of the ratchet 10 relative to the guide 20 when the pawls 30 and the ratchet 10 mesh with each other so as to be movable as a unit in the rotational direction.

As shown in FIG. 9, when the pawls 30 are pulled radially inwards as the rotating cam 40 rotates, the pawls 30 are released from meshing engagement with the inner tooth row 12A of the ratchet 10. As a result, the recliner 4 is released from the locked state in which relative rotation between the ratchet 10 and the guide 20 is inhibited, and is switched to the unlocked state in which the ratchet 10 and the guide 20 can rotate relative to each other. Each of the pawls 30 is formed in the shape of letter "U" having two leg portions 32 that extend radially inwards, and is also formed with an engaging portion 33 that protrudes from one of the leg portions 32 into the interior of the U shape.

As shown in FIG. 8, as the rotating cam 40 rotates, the rotating cam 40 presses the leg portions 32 of the pawls 30 from the inside in radial directions, so that the pawls 30 are pushed radially outwards. As shown in FIG. 9, as the rotating cam 40 rotates in the reverse direction, the engaging portions 33 of the pawls 30 are pulled radially inwards by hooks 44 of the rotating cam 40, so that the pawls 30 are pulled back radially inwards.

As described above referring to FIG. 8, the rotating cam 40 is received and mounted in the cam receiving recess 24B formed in the inner surface of the disc main body 21 of the guide 20. The rotating cam 40 is supported by the hinge cam 50 that is inserted into and mounted in the central portion of the cam 40, such that the rotating cam 40 is rotatable about its axis relative to the guide 20. As shown in FIG. 7, the rotating cam 40 is formed with a thickness substantially equal to that of each pawl 30, and is received in the cam receiving recess 24B (see FIG. 5), such that the rotating cam 40 and the pawls 30 are located at substantially the same position as viewed in the axial direction.

As shown in FIG. 8 and FIG. 9, the rotating cam 40 has recessed portions 42, shoulder portions 43 and the hooks 44. The recessed portions 42 are formed on the right and left side faces and lower face of the rotating cam 40, which face the pawls 30, such that the leg portions 32 of the pawls 30 can get into the recessed portions 42. When the rotating cam 40 is rotated in the direction of the arrow indicated in FIG. 8, the leg portions 32 of the pawls 30 received in the recessed portions 42 ride over the shoulder portions 43 of the rotating earn 40, so that the shoulder portions 43 push the leg portions 32 radially outwards. When the rotating cam 40 is rotated in the reverse direction, the hooks 44 are engaged with the engaging portions 33 of the pawls 30 so that the pawls 30 are pulled radially inwards.

An operating part 53 of the hinge cam 50 is mounted in the axial direction and set in the through-hole 41 formed in the central portion of the rotating cam 40, such that the hinge cam 50 and the rotating cam 40 are movable as a unit in the rotational direction. More specifically, the through-hole 41 is formed in the shape of a key hole, and the operating part 53 of the hinge cam 50 formed in the shape of a key hole is mounted in the through-hole 41, so that the rotating cam 40 and the operating part 53 (hinge cam 50) are movable as a unit in the rotational direction. With the operating part 53 thus mounted in the through-hole 41, the rotating cam 40 is rotated integrally with the hinge cam 50 when the hinge cam 50 is rotated about its axis in one direction or the other direction.

As shown in FIG. 8, the hinge earn 50 is normally biased in the clockwise direction as seen in FIG. 8 under the bias force of the lock spring 60, whereby the rotating cam 40 is held in a condition where it is pushed and rotated in the same clockwise direction. In this condition, the leg portions 32 of the pawls 30 are pushed radially outwards by the shoulder portions 43 formed on the right and left side faces and lower face of the rotating cam 40, so that the pawls 30 are meshed with the inner tooth row 12A of the ratchet 10. In this manner, the recliner 4 is held in the locked state in which its rotation is inhibited.

When the reclining lever 5 (see FIG. 1) is pulled up, and the hinge cam 50 is rotated in a direction opposite to the direction in which the cam 50 is biased, the rotating cam 40 is rotated in the counterclockwise direction as seen in FIG. 9 by the operating part 53 of the hinge cam 50, as shown in FIG. 9. As a result, the recessed portions 42 of the rotating cam 40 formed on its right and left side faces and lower face move toward positions right below (or radially inwardly of) the leg portions 32 of the pawls 30, so that the hooks 44 that extend from the above-indicated faces are gradually deeply pulled in for engagement with the engaging portions 33 of the corresponding pawls 30. Thus, the pawls 30 are retracted radially inwards, to be released from meshing engagement with the ratchet 10. In this manner, the recliner 4 is placed in the unlocked state. When the reclining lever 5 is returned to the original position, the operating part 53 of the hinge cam 50 rotates under the bias force of the lock spring 60 to cause the rotating cam 40 to be rotated in the clockwise direction again, so that the recliner 4 is returned to the locked state in which the pawls 30 are in meshing engagement with the inner tooth row 12A of the ratchet 10.

In the meantime, when the relative rotational positions of the ratchet 10 and the guide 20 are such that the above-described uplifted portion 12B is located in a region to which one of the pawls 30 (pawl 30C disposed on the left-hand side in FIG. 9 in this embodiment) is moved, the above-indicated one pawl 30C rides on the uplifted portion 12B and its movement is interrupted while the rotating cam 40 is pushing the pawls 30 radially outwards; consequently, the movements of all of the pawls 30 for meshing engagement are interrupted before the pawls 30 are brought into meshing engagement with the ratchet 10. Thus, the region in which the recliner 4 cannot be placed in the locked state due to riding of the above-indicated one pawl 30 on the uplifted portion 12B corresponds to the free zone as described above referring to FIG. 1 (i.e., the region in which the seat back 2 is not returned to the locked state in which the backrest angle is fixed even if the operation to pull up the reclining lever 5 is stopped). Also, the region in which none of the pawls 30 rides on the uplifted portion 12B, and the recliner 4 can be placed in the locked state (i.e., the region in which the uplifted portion 12B is located in an upper region between the pawl 30B and the pawl 30C in FIG. 9) corresponds to the lock zone as described above referring to FIG. 1 (i.e., the region in which the seat back 2 is returned to the locked state in which the backrest angle is fixed when the operation to pull up the reclining lever 5 is stopped).

Here, the pawl 30A disposed in the lower pawl receiving recess 24A as shown in FIG. 8 and FIG. 9, out of the three pawls 30 (30A-30C) as described above, consists of a first piece 30A1 and a second piece 30A2 into which the pawl 30A is divided in the circumferential direction. The first piece 30A1 constitutes a large portion of the pawl 30A, and has an outer circumferential surface on which the outer tooth row 31 is formed, and a radially inner portion in which one leg portion 32 and engaging portion 33 of the pawl 30A are formed. The second piece 30A2 constitutes a smaller portion of the pawl 30A than the first piece 30A1, and the outer tooth row 31 is not formed on its outer circumferential surface. The second piece 30A2 is formed as a small piece of a size suitable for forming the other leg portion 32 of the pawl 30. A parting line along which the pawl 30A is divided into the first piece 30A1 and the second piece 30A2 has a vertical line that extends straight between these pieces in the vertical direction, and an oblique line that extends obliquely to form a laterally-facing V-shaped bend.

With the pawl 30A thus divided into two pieces, the first piece 30A1 is formed with a vertical face 30A1*a*, a first inclined face 30A1*b*, and a second inclined face 30A1*c*, as shown in FIG. 8. The vertical face 30A1*a* is formed on the left-side face of the first piece 30A1 adjacent to the second piece 30A2, so as to face straight leftward in FIG. 8 (in a direction perpendicular to the direction in which the pawl 30A is moved, i.e., advanced and retracted). The first inclined face 30A1*b* faces obliquely to the lower left, and the second inclined face 30A1*c* faces obliquely to the upper left. Also, the second piece 30A2 is formed with a vertical face 30A2*a*, a first inclined face 30A2*b*, and a second inclined face 30A2*c*. The vertical face 30A2*a* is formed on the right-side face of the second piece 30A2 adjacent to the first piece 30A1, so as to face straight rightward (in the direction perpendicular to the direction in which the pawl 30A is moved, i.e., advanced and retracted), to be opposed to the vertical face 30A1*a* of the first piece 30A1. The first inclined face 30A2*b* faces obliquely to the upper right, to be opposed to the first inclined face 30A1*b* of the first piece 30A1, and the second inclined face 30A2*c* faces obliquely to the lower right, to be opposed to the second inclined face 30A1*c* of the first piece 30A1.

When the rotating cam 40 rotates in the clockwise direction, as shown in FIG. 8, the leg portion 32 of the second piece 30A of the divided pawl 30A is pushed radially outwards by the corresponding shoulder portion 43 of the rotating cam 40. As a result, the second inclined face 30A2*c* of the second piece 30A2 obliquely presses the second inclined face 30A1*c* of the first piece 30A1 radially outwards, so that the first piece 30A1 and the second piece 30A2 are respectively pushed radially outwards while being moved in contact with each other in the opposite circumferential directions, until the outer tooth row 31 of the first piece 30A1 is pushed against and meshed with the inner tooth row 12A of the ratchet 10. At this time, the lateral width of the pawl 30A as a whole is increased due to sliding movements of the first piece 30A1 and the second piece 30A2 in the opposite circumferential directions, and the outer tooth row 31 of the first piece 30A1 is pressed against and meshed with the inner tooth row 12A of the ratchet 10, in a condition where the circumferentially opposite side faces of the pawl 30A are pressed against the guide walls 23 that support these pieces 30A1, 30A2. As a result, the pawl 30A is held in meshing engagement with the ratchet 10, with no backlash created in the circumferential direction between the pawl 30A and the guide 20.

Namely, the width of each of the pawl receiving grooves 24A is set to be larger than the lateral width of each of the pawls 30, so as to assure the ease or efficiency with which the pawl 30 is mounted in the pawl receiving groove 24A and the sliding capability of the pawl 30. Therefore, even when each pawl 30 is in meshing engagement with the inner tooth row 12A of the ratchet 10, the ratchet 10 and the guide 20 minutely shake each other in the circumferential direction, due to clearances that cause the pawl 30 to minutely shake in the circumferential direction within the pawl receiving groove 24A. However, in this embodiment, the divided pawl 30A is arranged to mesh with the ratchet 10, in a condition where the lateral width of the pawl 30A is increased to eliminate the circumferential backlash between the pawl 30A and the guide 20; therefore, the ratchet 10 and the guide 20 are prevented from shaking each other in the circumferential direction, and thus prevented from rotating relative to each other.

Figure 10:
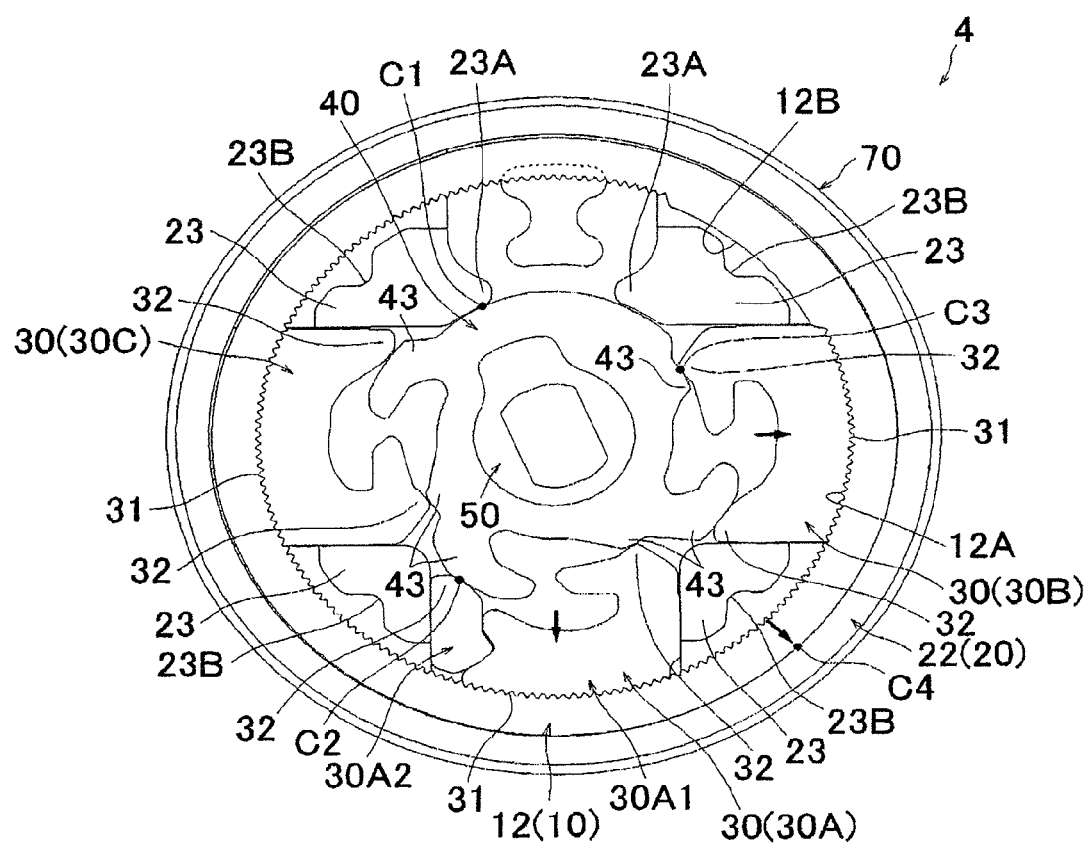
FIG. 10 is a schematic view showing the recliner while laying emphasis on support points when the recliner is placed in the locked state.

As shown in FIG. 10, when the rotating cam 40 rotates so that the pawls 30 are pressed against the inner tooth row 12A of the ratchet 10, a part of the outer circumferential surface of the rotating cam 40 is initially pressed against the extended portion 23A of the left, upper guide wall 23 formed on the guide 20 (contact C1), so that the rotating cam 40 receives eccentric force from the guide 20 so as to be pushed to the lower right, from the central portion. As a result, the rotating cam 40 pushes the lower pawl 30A and the right pawl 30B to respective positions beyond the positions at which the pawls 30A, 30B are pressed against the inner tooth row 12A of the ratchet 10, so as to push and move the ratchet 10 (contacts C2, C3). With the two pawls 30A, 303 pushed out to the overrun positions, the ratchet 10 is pushed out to the lower right as a direction of the combined force of the pushing forces, relative to the guide 20, and the cylindrical portion 12 of the ratchet 10 is pressed against the inner circumferential surface of the cylindrical portion 22 of the guide 20 (contact C4). Consequently, a radial clearance set between the cylindrical portion 12 of the ratchet 10 and the cylindrical portion 22 of the guide 20 is eliminated, and the ratchet 10 and the guide 20 are prevented from minutely shaking in radial directions, too, and thus prevented from rotating relative to each other.

More specifically, when the rotating cam 40 pushes the two pawls 30A, 303 to the overrun positions, the shoulder portions 43 formed on lower and right peripheral portions of the rotating cam 40 press the leg portion 32 of the second piece 30A2 of the lower pawl 30A, and the upper leg portion 32 of the right pawl 30B, respectively (contact C2, contact C3). Strictly speaking, there are slight clearances between the shoulder portions 43 formed at the positions on the periphery of the rotating cam 40 corresponding to the other leg portions 32 of the pawls 30, and the corresponding leg portions 32 of the pawls 30, and these shoulder portions 43 serve to support the pawls 30 in a standby state at radially inner positions, so that the pawls 30 are prevented from being disengaged from the ratchet 10. Strictly speaking, there is also a slight clearance between the extended portion 23A formed on the upper right guide wall 23, and the outer circumferential surface of the rotating cam 40, and the extended portion 23A functions to receive unbalanced reaction force applied to the rotating cam 40 in the upward direction when each pawl 30 receives a load in such a direction as to be disengaged from the ratchet 10.

Thus, the rotating cam 40, when rotating, is arranged to push the lower pawl 30A and the right pawl 30B (two pawls located adjacent to each other in the circumferential direction), to the overrun positions. Also, the extended portion 23A that applies the eccentric force to the rotating cam 40 in the above-indicated pushing direction is formed such that a peripheral part of the rotating cam 40 is initially pressed against a position within a region that is symmetric with a circumferential region between the two pawls 30A, 30B, with respect to the central portion of the guide 20. With this arrangement, the ratchet 10 is radially pressed at two points in the circumferential direction, toward the guide 20; thus the ratchet 10 can be stably pressed against the guide 20.

As shown in FIG. 4 and FIG. 5, the hinge cam 50 is a shaft member having a spring engaging portion 51 in the shape of a rectangular tube, a cylindrical shaft portion 52, and the operating part 53 having a horn that protrudes radially outwards. The spring engaging portion 51, shaft portion 52, and the operating part 53 are arranged in the axial direction. A through-hole 50A in the form of a rectangular hole is formed in the axial direction through a central portion of the hinge cam 50. The spring engaging portion 51 and shaft portion 52 of the hinge cam 50 are passed from the inside through the through-hole 21A formed in the central portion of the guide 20, so that the hinge cam 50 is mounted on the guide 20, at a position where the operating part 53 abuts on the inner surface of the disc main body 21 of the guide 20. With the hinge cam 50 mounted at this position, the spring engaging portion 51 protrudes outwardly of the guide 20, and the shaft portion 52 is rotatably fitted in the through-hole 21A of the guide 20.

The hinge cam 50 is engaged with the lock spring 60 to be movable as a unit with the lock spring 60 in the rotational direction, such that an inner end portion of the lock spring 60, which is wound in a rectangular shape, is fitted on a rectangular peripheral portion of the spring engaging portion 51 that protrudes outward from the guide 20. As shown in FIG. 3, the lock spring 60 in the form of a spiral spring is disposed on the outer surface of the guide 20, and the inner end portion of the lock spring 60 is engaged with the spring engaging portion 51 of the hinge cam 50, while its outer end portion is engaged with the spring engaging portion 25 formed on the outer surface of the guide 20 to protrude therefrom. With this arrangement, the lock spring 60 is adapted to normally apply bias force to the hinge cam 50 so as to rotate the hinge cam 50 relative to the guide 20 in the direction to permit the locking action of the rotating cam 40.

As shown in FIG. 7, the operating pin 5A is inserted into a central portion (the through-hole 50A) of the hinge cam 50 mounted between the ratchet 10 and the guide 20, from its end portion where the spring engaging portion 51 is formed. The operating pin 5A thus inserted is firmly and integrally joined to the hinge earn 50 by welding. A large flange portion having the larger diameter than the through-hole 50A of the hinge cam 50 is formed on an end portion of the operating pin 5A opposite to the side on which the pin 5A is inserted into the through-hole 50. The reclining lever 5 is joined integrally to a head portion of the operating pin 5A which extends axially outwards from the flange portion. Thus, the hinge cam 50 is integrally coupled to the reclining lever 5, via the operating pin 5A inserted therethrough. As described above referring to FIG. 1, when the reclining lever 5 is pulled up, the hinge cam 50 rotates the rotating cam 40 in the releasing direction (i.e., the direction to release the pawls 30 from the locked states).

As shown in FIG. 7, a distal end portion of the operating pin 5A which is inserted through the through-hole 50A of the hinge cam 50 is connected to an end portion of the operating pin 5A similarly inserted in the recliner 4 (not shown) on the other side of the seat, via the connecting rod 5B, such that the operating pins 5A thus connected are movable as a unit in the rotational direction. With this arrangement, when the reclining lever 5 is operated, the operating pins 5A inserted through the recliners 4 on the opposite sides of the seat are rotated about their axis at the same time. With the shaft portion 52 of the hinge cam 50 mounted in the through-hole 21A of the guide 20, the operating part 53 of the hinge cam 50 is mounted in position to be set in the through-hole 41 of the rotating cam 40 while abutting against the inner surface of the disc main body 21 of the guide 20.

As shown in FIG. 4 and FIG. 5, the outer ring 70 is formed into a stepped cylindrical shape having a seat, by stamping a thin steel plate into a disc or ring shape, and drawing an outer peripheral portion of the disc formed by stamping, in the thickness direction. More specifically, a radially inner portion of the seat of the outer ring 70 is further subjected to half-blanking in the axial direction, relative to a radially outer portion of the seat, so that a first retainer portion 71 is formed in the radially inner portion of the seat, and a second retainer portion 72 is formed in the radially outer portion of the seat. The first retainer portion 71 is placed against an axially outer end face of the cylindrical portion 12 of the ratchet 10, and the second retainer portion 72 is placed against an axially inner end face of the cylindrical portion 22 of the guide 20.

The ratchet 10 and the guide 20, which are assembled in the axial direction, is set within the cylinder of the outer ring 70, so that the axially outer end face of the cylindrical portion 12 of the ratchet 10 is placed against the first retainer portion 71, and the axially inner end face of the cylindrical portion 22 of the guide 20 is placed against the second retainer portion 72. In this condition, the cylindrical portion of the outer ring 70 extends over the outer peripheral portions of the ratchet 10 and the guide 20. An edge of the cylindrical portion of the outer ring 70 is bent radially inwards by caulking, to form a caulked portion 73 that extends from the second retainer portion 72, so that the cylindrical portion 22 of the guide 20 is sandwiched between the caulked portion 73 and the second retainer portion 72. Thus, the outer ring 70 is assembled integrally with the guide 20.

With the outer ring 70 and the guide 20 thus assembled together, the first retainer portion 71 of the outer ring 70 faces the outside of the cylindrical portion 12 of the ratchet 10 in the axial direction, and the outer ring 70 retains the ratchet 10 while allowing the ratchet 10 to be rotated without coming off the guide 20 in the axial direction. A plurality of projections 71A, which protrude in the axial direction and are formed by half-blanking, are arranged at equal intervals in the circumferential direction, on an edge portion of the inner surface of the first retainer portion 71 of the outer ring 70, which faces the outer face of the cylindrical portion 12 of the ratchet 10. The outer ring 70 is arranged to support the ratchet 10 with the projections 71A being substantially in point-contact with the ratchet 10 in the axial direction, so that resisting force due to sliding friction is less likely to be produced at contact portions of the outer ring 70 with the ratchet 10 during rotary movement of the ratchet 10.

As shown in FIG. 5, FIG. 8 and FIG. 9, a partially recessed part 23B is formed in each of the guide walls 23 of the guide 20 which support each of the pawls 30 from the opposite sides in the circumferential direction, such that the recessed part 23B is located at an outer periphery of a middle portion of the guide wall 23 as seen in the circumferential direction. When the guide walls 23 are formed by half-blanking in the thickness direction, the recessed parts 23B are left without being subjected to half-blanking, to be thus formed in recessed form relative to the guide walls 23. Each of the recessed parts 23B is formed in the shape of a rounded right triangle that is open radially outwardly of the guide wall 23. Here, each of the recessed parts 23B functions as "weak portion" of the invention.

Figure 11:
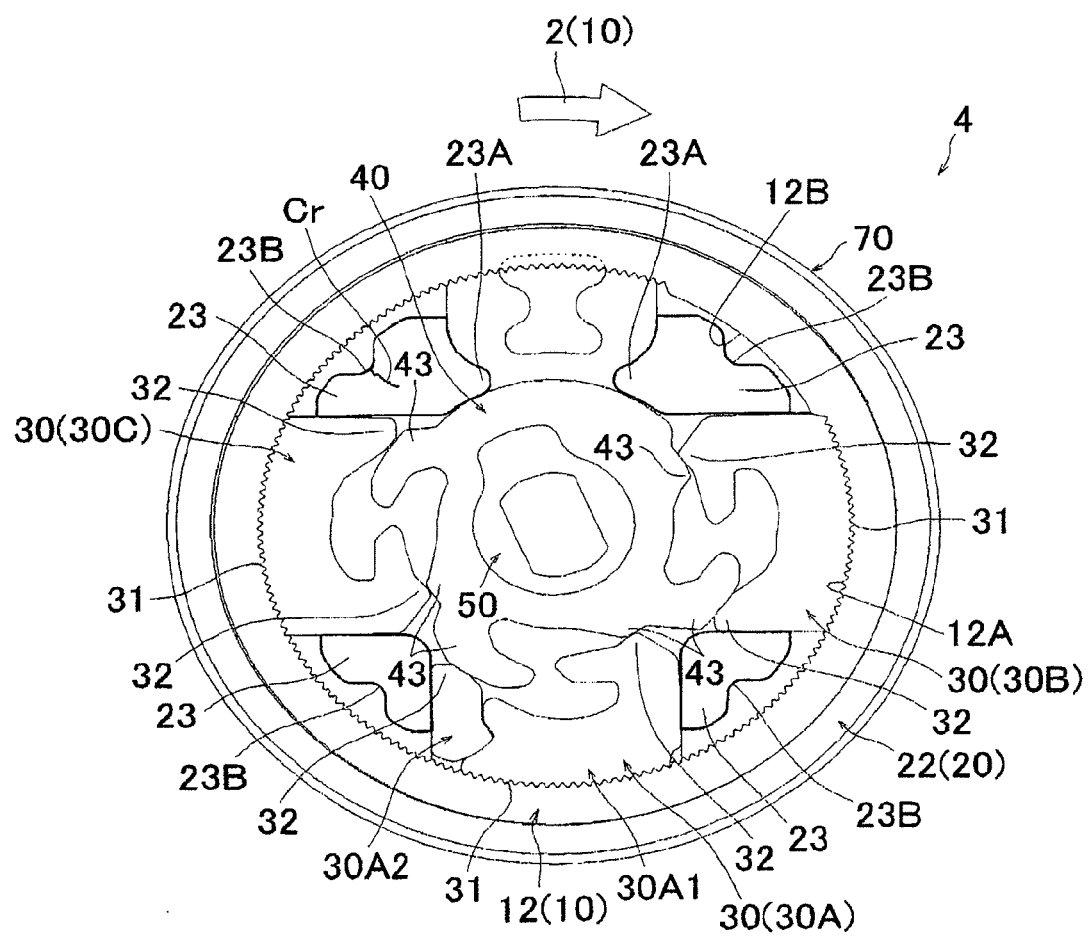
FIG. 11 is a schematic view showing a condition where the recliner is deformed when it receives a large load.

While the guide walls 23 are normally arranged to support the pawls 30 with high rigidity from the circumferentially opposite sides thereof, the guide walls 23 may be deformed in a certain situation as described below since the recessed parts 23B are formed in the middle portions of the guide walls 23. As shown in FIG. 11, when the recliner 4 receives a large load that causes deformation in a direction in which the recliner 4 is forced to be rotated, upon occurrence of a collision of the vehicle, for example, the pawls 30 that are in meshing engagement with the ratchet 10 are forcedly rotated in the circumferential direction along with the ratchet 10, and the guide walls 23 can be deformed due to the movements of the pawls 30. In this embodiment in which the recessed parts 23B shaped as described above are formed in the guide walls 23, when a large load is applied to the recliner 4, a crack Cr is formed obliquely in the direction of 45 degrees, in a radially inner corner portion of any of the recessed parts 23B (the upper left recessed part 23B in FIG. 11). With the crack thus formed, the guide walls 23 can be deformed while the pawls 30 are held in mesh with the ratchet 10, so as to absorb the excess load applied to the recliner 4 and let it escape.

Namely, each of the recessed parts 23B is formed at a location spaced in the circumferential direction apart from contact faces of the guide wall 23 which are in contact with the corresponding pawls 30. Therefore, as compared with the case where the recessed part 23B is formed in a contact face of the guide wall 23 which is in contact with the pawl 30, the pressing force which each of the guide walls 23 supporting the pawl 30 from the circumferentially opposite sides receives from the pawl 30 is less likely to reach the region where the recessed part 23B is formed, during normal use; therefore, the guide walls 23 can support the pawl 30 without suffering from reduction in the rigidity with which the pawl 30 is supported. Accordingly, while the recliners 4 are in the locked state where the rotation is inhibited, the highly rigid supporting structure as described above can firmly support the side frames 2Fa (see FIG. 1) of the seat back 2, without allowing the side frames 2Fa to deflect back and forth. Also, the highly rigid supporting structure makes it less likely or unlikely for the driver to suffer from traumatic cervical syndromes (TCS), which would occur if the side frames 2Fa of the seat back 2 deflect backwards when a back impact occurs to the vehicle.

When the guide walls 23 receive a large load produced upon occurrence of a collision of the vehicle (e.g., a large load produced when the back of the occupant is pressed against the seat back 2 due to impulse of a back impact of the vehicle), the pressing force received from the pawls 30 reaches the regions of the guide walls 23 where the recessed parts 23B are formed, and stress concentration occurs in the recessed parts 23B, resulting in plastic deformation thereof. More specifically, the recessed parts 23B formed in the guide walls 23 are formed at outer peripheral locations at which the guide walls 23 receive large pressing force from portions of the pawls 30 in the vicinity of their outer peripheries close to load input points of the pawls 30 at which the pawls 30 receive load input from the ratchet 10 meshing with the pawls 30, in the rotational direction. Thus, when the large load is applied, stress concentration effectively occurs in portions of the guide walls 23 where the recessed parts 23B are formed, resulting in plastic deformation of the guide walls 23. The deformation of the guide walls 23 makes it possible to receive the large load while absorbing energy, without damaging or braking the pawls 30, while keeping the pawls 30 in meshing engagement with the ratchet 10 (while keeping the recliner 4 in the locked state). Accordingly, it is possible to provide the structure that can withstand input of a large load, without causing the recliner 4 to be released from the locked state at the time of input of the large load, even if the structural strength of the pawls 30 is not greatly increased.

While one embodiment of the invention has been described with reference to the drawings, the invention may be embodied in various forms other than those of the illustrated embodiment. For example, the recliner of the invention may be applied to a seat other than the passenger seat of the automobile, and may also widely applied to seats provided in vehicles, such as rail vehicles, other than automobiles, airplanes, ships, and others. Also, the base to which the seatback is coupled may be a bracket member provided on the floor, and the like, other than the seat cushion provided on the floor.

The recliner may be constructed such that a slide cam that slides in radial directions due to rotation of the hinge cam, rather than the rotating cam that rotates with the hinge cam, is used for pressing the pawls against the inner tooth row of the ratchet or moving the pawls away from the inner tooth row. Also, the recliner may include two or four pawls arranged to be in meshing engagement with the inner tooth row of the ratchet.

The weak portion of the invention may be formed by forming a through-hole or forming a notch or a slit in a part of the guide wall, rather than the recessed part as described above in the illustrated embodiment. Also, the weak portions may be formed at locations, other than those on the outer peripheries of the guide walls, provided that the locations are spaced apart from the contact faces of the guide walls with the pawls in the circumferential direction.

What is claimed is:

1. A recliner that couples a seat back with a base on a floor such that a backrest angle of the seat back can be adjusted, comprising:
    a ratchet and a guide which are assembled together so as to be rotatable relative to each other; and
    a pawl supported by the guide in a circumferential direction, the pawl being adapted to mesh with the ratchet when pushed radially outwards so as to inhibit rotational movement of the ratchet relative to the guide, wherein
    the pawl is sandwiched between and supported by guide walls provided in the guide, the guide walls being located at circumferentially opposite sides of the pawl, and
    each of the guide walls has a weak portion provided at a location spaced in the circumferential direction apart from a contact face of the guide wall which is in contact with the pawl, the weak portion being adapted to undergo local stress concentration and plastic deformation due to pressing force received from the pawl when a large load that causes the pawl to undergo forced deformation in the circumferential direction is applied.

2. The recliner according to claim 1, wherein the weak portion is provided at an outer peripheral location of the guide wall.

3. The recliner according to claim 2, wherein the weak portion comprises a recessed part provided at the outer peripheral location of the guide wall.

4. The recliner according to claim 1, wherein the pawl is slidable radially outward relative to the guide walls.

5. The recliner according to claim 1, wherein the weak portion is defined as a rounded right triangular recess that is open radially outward of the guide wall.

\* \* \* \* \*